(12) United States Patent
Ito

(10) Patent No.: US 6,913,430 B2
(45) Date of Patent: Jul. 5, 2005

(54) BOARD ANCHOR

(75) Inventor: Katsuo Ito, Sapporo (JP)

(73) Assignee: Koyo Kizai Co., Ltd. (JP)

( * ) Notice: Subject to any disclaimer, the term of this patent is extended or adjusted under 35 U.S.C. 154(b) by 0 days.

(21) Appl. No.: 09/828,567

(22) Filed: Apr. 9, 2001

(65) Prior Publication Data

US 2002/0015629 A1 Feb. 7, 2002

(30) Foreign Application Priority Data

Aug. 7, 2000 (JP) ........................................ 2000-238503

(51) Int. Cl.⁷ ............................................. F16B 21/00
(52) U.S. Cl. ........................................ 411/340; 411/346
(58) Field of Search .................................. 411/340–346

(56) References Cited

U.S. PATENT DOCUMENTS

| | | | | | |
|---|---|---|---|---|---|
| 1,084,289 A | * | 1/1914 | Newhall | ...................... | 411/346 |
| 1,179,449 A | * | 4/1916 | Newhall et al. | ............. | 411/346 |
| 1,374,924 A | * | 4/1921 | Karitzky | ...................... | 411/346 |
| 2,144,895 A | * | 1/1939 | Place | .......................... | 411/342 |
| 2,567,372 A | * | 9/1951 | Gelpcke | ...................... | 411/342 |
| 3,302,508 A | * | 2/1967 | Topf | ............................ | 411/341 |
| 3,946,636 A | * | 3/1976 | Grey | ........................... | 411/346 |
| 4,286,497 A | * | 9/1981 | Shamah | ...................... | 411/342 |
| 4,298,298 A | * | 11/1981 | Pontone | ...................... | 411/342 |
| 5,209,621 A | * | 5/1993 | Burbidge | .................... | 411/340 |

* cited by examiner

Primary Examiner—William L. Miller
(74) Attorney, Agent, or Firm—Irving Keschner

(57) ABSTRACT

A board anchor comprising a screw shaft, freely rotating anchor section attached to the screw shaft via a spring and stop attachment for re-positioning the anchor section in a crosswise position against the screw shaft from a position parallel with the screw shaft, a stopper mechanism that stops the above screw shaft in the above cross position, and an attachment ring that screws onto the screw shaft, with the anchor section having a screw hole which fits the screw in the above upright position.

3 Claims, 4 Drawing Sheets

BOARD ANCHOR

BACKGROUND OF THE INVENTION

1. Field of the Invention

The present invention provides a board anchor for affixing an object to a wall or board.

2. Description of the Prior Art

Conventional prior art board anchors consist of a shaft section, an anchor section affixed to one edge of the shaft and a screw section formed at the other end of the shaft. When affixing an object to a board, the shaft section is inserted through a hole bored through one side of a wall, while the anchor section is in flush contact with the wall. On the other side of the wall, the board is placed against the wall so that the shaft is inserted into the screw hole in the board, and the board is pressed and anchored to the wall by tightening a nut attached to the screw section.

In the conventional board anchor, it is necessary to work from both sides of the wall to anchor the board to the wall. Therefore, if the wall is hollow, one can work only on one side of the wall, thus making it impossible to anchor the board to a hollow wall. Also, it is difficult for one person to work on both sides of the wall, causing problems in terms of operational ease. Moreover, work efficiency declines if more than one worker is required to anchor a board.

Therefore what is desired is to provide a board anchor that enables a board to be anchored on a hollow wall by one person thus enhancing operability and work efficiency.

SUMMARY OF THE PRESENT INVENTION

The present invention provides a board anchor having a screw shaft, a freely revolving anchor section attached to the screw shaft, a re-positioning device for positioning the anchor section in a cross position against the screw shaft from a position parallel with the screw shaft, a stopper mechanism that stops the screw shaft in the upright position, and an attachment ring that screws onto the screw shaft, with the anchor section having a screw hole which fits the screw in the upright position.

To anchor a board to a wall using the board anchor of the present invention, the anchor section is rotated and placed in a parallel position. That is, the anchor section and the screw shaft are positioned along a straight line. On one side of the wall, the screw shaft and anchor section are both inserted through the insertion hole in the wall. The anchor section is then rotated toward a cross position from its parallel position through the force of the re-positioning device when the shaft and anchor pass through the hole, and the anchor is stopped in a cross position by the stopper mechanism. From the same side of the wall, the screw shaft is then pulled back in the opposite direction to the direction of insertion to place the anchor section flush against the other side of the wall. The board is then placed closely against the wall before inserting the screw shaft through the screw hole on the board. Finally, the nut is screwed onto the end section of the screw shaft on the board side. The screw is tightened to press the board against the wall, thus anchoring the board to the wall.

In this manner, because the freely rotating anchor section is attached to the screw shaft via an attachment material, the screw shaft and the anchor section can both be inserted through the hole by positioning them in a straight line, thus making it unnecessary to work from both sides of the wall. Therefore, the anchoring of the board can be done from one side of the wall and the board can be anchored even if the wall is hollow. Since the work is done on one side of the wall, one person is able to anchor the board, thus, enhancing operability and work efficiency.

As the anchor section stops in a cross position because of the stopper mechanism, the anchor section can easily be positioned flush against the wall even from the other side of the wall.

In addition, after the anchor section stops in a cross position to the screw shaft, the screw shaft is screwed into the attachment ring and the screw hole in the anchor section. As the stopper mechanism has stopped the anchor section in a cross position, the positions of the screw shaft and the screw hole on the anchor section become aligned, thus allowing the screw shaft to easily screw into the anchor section. Moreover, as the screw shaft is screwed into the attachment ring the screw shaft is able to move forward or backward. The position of the screw shaft is also fixed vis-à-vis the screw hole, and thus is easily screwed into the hole.

Since the screw shaft and the anchor section are connected by screw through the hole, the connection is strong thus providing a strong anchoring strength through the anchor.

Since the screw shaft and the anchor section are linked by screw coupling, the device can be used for boards and walls of varied thickness by adjusting the length of the screw shaft through the insertion hole on the wall. Moreover, since the screw shaft and anchor section are linked through a screw coupling, the screw shaft can be removed from the anchor section. Therefore, the device can be used in walls and boards of varied thickness by using various lengths of screw shafts for the anchor section.

One embodiment of the board anchor is characterized by a configuration of the stopper mechanism, a flat board trunnion of the attachment ring, and an adjustment screw hole formed on the anchor and linked to the trunnion. The adjustment screw hole is designed to affix the trunnion to stop the anchor in a cross position.

The trunnion and the adjustment hole are able to stop the anchor section in a cross position without fail as the stopper mechanism is activated because the trunnion is affixed in the hole to stop the anchor in the upright position.

The board anchor has a re-positioning device with the end of the anchor section clamped to a board spring by the strength of the spring. The re-positioning device can be easily installed on the anchor section because the end of the anchor section is a board spring clamped on with the strength of the spring. The board anchor has a bushing that moves freely along the circumference connection of the screw shaft.

As the bushing moves freely along the circumference connection of the screw shaft, the insertion of the screw shaft becomes stable by adjusting the bushing to conform with the insertion hole in which the screw shaft is inserted, leading the screw shaft smoothly into the screw hole of the anchor section. Since the screw shaft moves against the inner circumference of the bushing, it is difficult for the screw shaft to slip out of the bushing, thus preventing the screw shaft from falling out to the opposite side of the wall where the insertion is made.

The anchor section has an affixed section where the screw shaft is affixed in the inner circumference surface of the screw insertion hole. As the affixed section of the anchor section is affixed in the inner circumference of the insertion hole, the screw shaft will not idly rotate when it is screwed into the screw hole of the anchor section. The screw shaft thus can be easily and correctly screwed into the screw hole of the anchor.

The present invention thus provides a board anchor whereby one person can anchor the board, enhancing installation operability and work efficiency. The connection provided by the board anchor of the present invention is strong and can be used with boards and walls of various thicknesses.

DESCRIPTION OF THE DRAWING

For a better understanding of the invention as well as other objects and further features thereof, reference is made to the following description which is to be read in conjunction with the accompanying drawings wherein.

DESCRIPTION OF THE INVENTION

Figure 1:
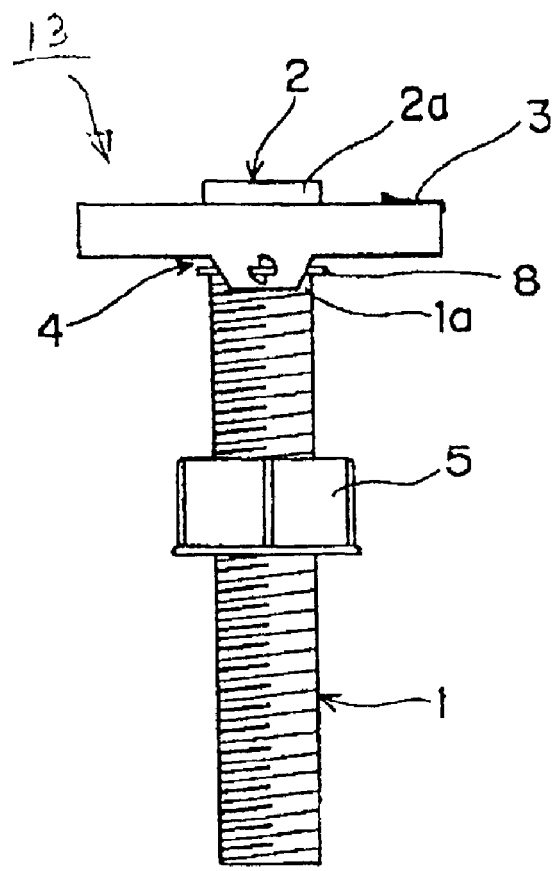
FIG. 1 is a front elevation view of the board anchor of the present invention.
Figure 7:
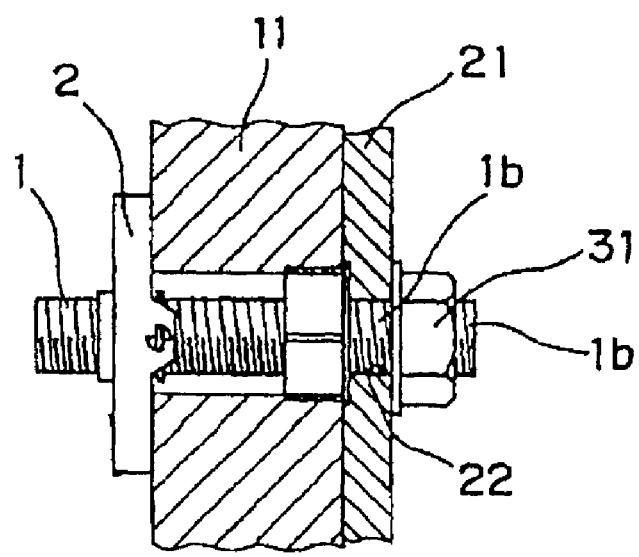

Referring now to FIG. 1, the anchor board device 13 of the present invention is illustrated. Anchor board device 13 is used to anchor board 21 to wall 11 (FIG. 7).

Anchor board 13 is equipped with screw shaft 1, freely movable, rectangular shaped anchor section 2 connected via attachment ring 8 to screw shaft 1, plate spring 3, (a pressure device that re-positions anchor section 2 to a 90 degree crosswise position to screw shaft 1 from a position parallel with the shaft), and stopper mechanism 4 which stops the anchor section 2 at the cross position. Attachment ring 8 is screwed onto end section 1a of screw shaft 1. A ring washer 5 is installed on the outer circumference of screw shaft 1 with freedom of movement along the screw and functions as a bushing.

Figure 2:
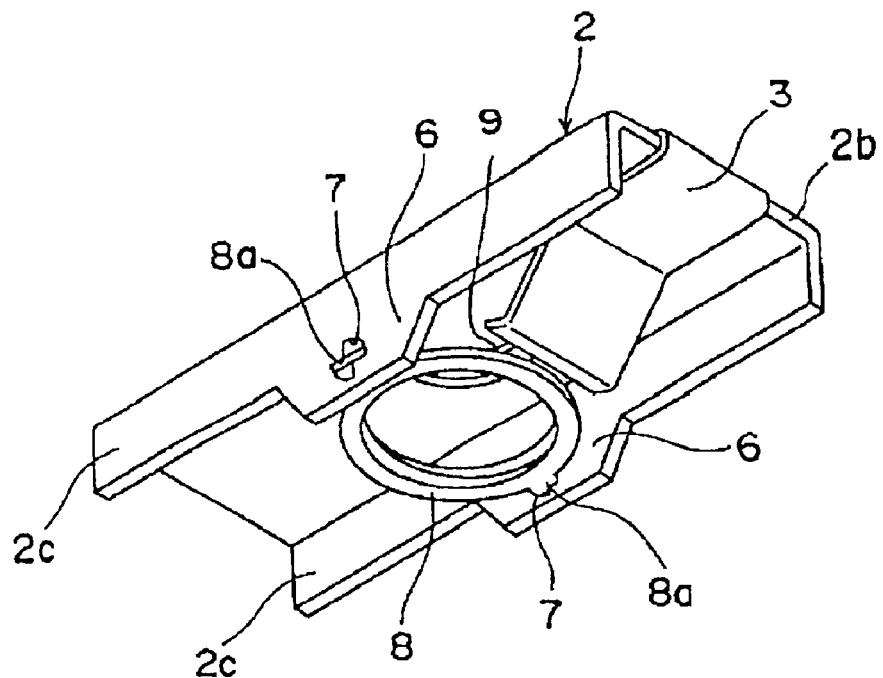
FIG. 2 is a bottom perspective view of the anchor section portion of the board anchor shown in FIG. 1.
Figure 3:
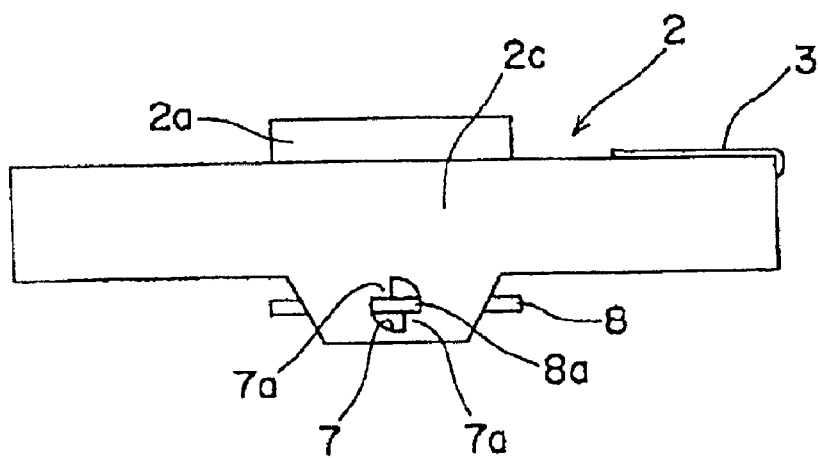
FIG. 3 is a front elevational view of the anchor section shown in FIG. 2.

Anchor section 2 has screw section 2a where screw shaft 1 is inserted. As shown in FIG. 2, screw section 2a of anchor section 2 forms screw hole 9 that fits screw shaft 1 in an open position. Also, end section 2b of anchor section 2 has plate spring 3 clamped on with the force of the spring strength. Anchor section 2 has flange sections 2c, 2c with trapezoid shapes 6, 6 to fit in the inner circumference of insertion hole 12 (See FIGS. 6 and 7) of wall 11. Flat plate trunnions 8a, 8a are formed on attachment ring 8 and adjustment holes 7, 7 are formed on suspension sections 6,6 of anchor section 2. Adjustment holes 7,7 as shown in FIG. 3, have protrusions 7a, 7a which protrude through sections 6,6 in the diameter direction. These protrusions 7a, 7a restrict the rotation of attachment ring 8 against anchor section 2 and suspend trunnions 8a, 8a to stop anchor section 2 in a correct position. Specifically, attachment ring 8 rotates against anchor section 2 within a range of 0 to 90 degrees. The stopper mechanism 4 (FIG. 1) is comprised of the trunnions 8a, 8a of attachment ring 8 and adjustment holes 7,7 of anchor section 2.

Wall 11 is anchored to board 21 (FIG. 7) using board anchor 9 in the following manner.

Figure 4:
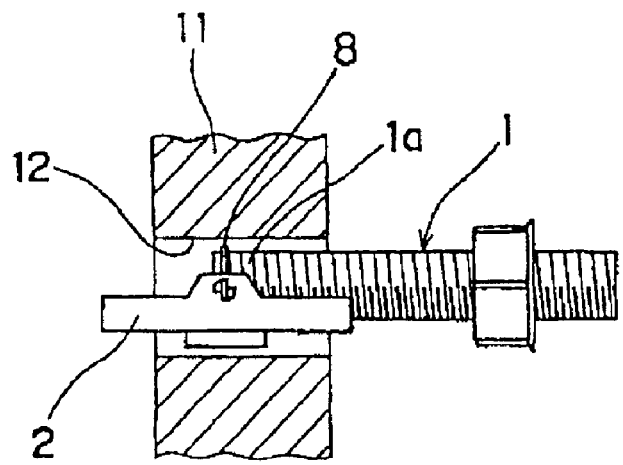
FIGS. 4–7 illustrate the installation of the board anchor shown in FIG. 1.
Figure 5:
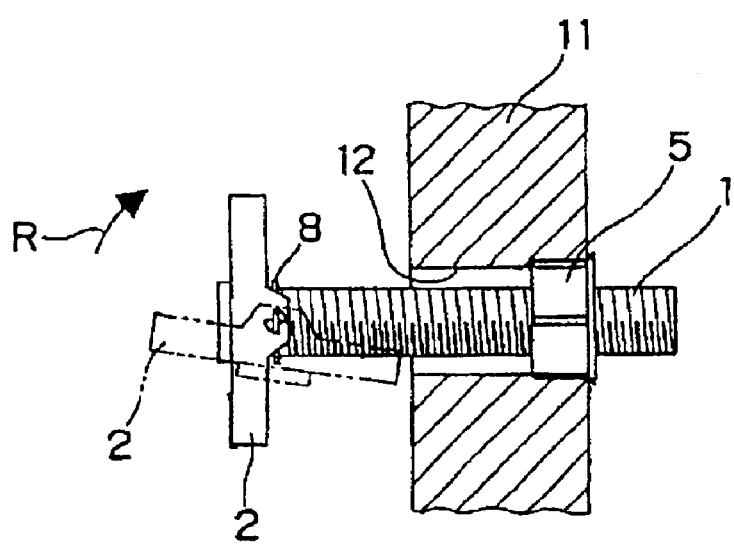

Referring to FIG. 4, anchor section 2 is rotated and set in a parallel position with only attachment ring 8 screwed onto end 1a of screw shaft 1. In other words, anchor section 2 and screw shaft 1 are positioned in a parallel line i.e. parallel to the longitudinal axis of screw shaft 1. In this state, anchor section 2, together with screw shaft 1 are inserted through hole 12 of wall Referring to FIG. 5, screw shaft 1 is pushed in further until it clears insertion hole 12. When anchor section 2 passes through insertion hole 12, the re-positioning force of plate spring 3 turns anchor section 2 in the direction of arrow R from the parallel position shown in dotted lines to the cross position shown in solid lines (the cross-position is approximately perpendicular to the longitudinal axis of screw shaft 1). The rotation of anchor 2 is restricted by stopper mechanism 4, and anchor section 2 stops in a cross position against screw shaft 1. Specifically, when anchor section 2 rotates in direction of arrow R, the trunnion 8a of attachment ring 8 connects to protrusions 7a, 7a of adjustment hole 7 to stop the rotation of anchor section 2 when the anchor section 2 rotates approximately 90 degrees against attachment ring 8.

Figure 6:
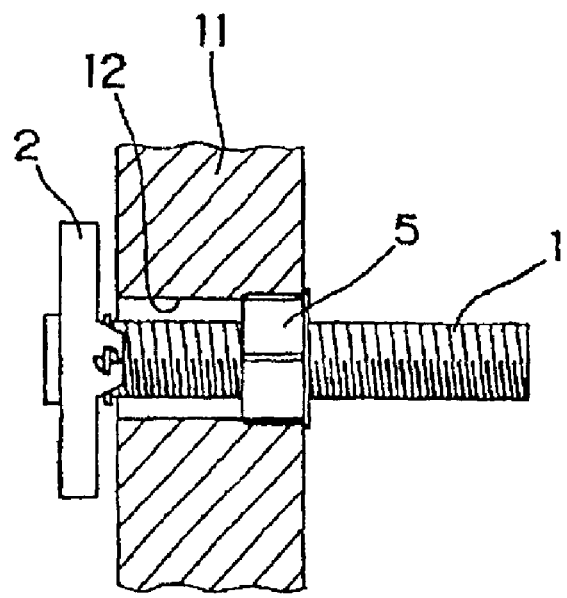

Referring now to FIG. 6, screw shaft 1 is pulled in until anchor section 2 is flush against wall 11. In this state, screw shaft 1 is screwed into screw hole 9 for the necessary amount to couple screw shaft 1 with anchor section 2.

Referring now to FIG. 7, after aligning screw hole 22 on board 21 with screw shaft 1, and by pressing board 21 flush against wall 11, screw shaft 1 is screwed into threaded screw hole 22. Finally, nut 31 is screwed onto the outer end of screw shaft 1, 1b and tightened. Board 21 is then pressed and anchored onto the wall 11.

In this manner, because anchor section 3 is attached to screw shaft 1 in a freely movable state via attachment ring 8, by aligning anchor section 2 and screw shaft 1 in a straight line, it is possible to insert screw shaft 1 together with anchor section 2 through hole 12 in wall 11. Thus, there is no need to work from both sides of wall 11, the anchoring work of board 21 being performed from only one side of wall 11. Even if wall 11 is hollow, it is possible to anchor board 21. Also, as the work involved is being performed from only one side of wall 11, anchoring board 21 can be done by one person, thus enhancing operability and work efficiency.

Since stopper mechanism 4 is used to stop anchor section 2 in a crosswise position, it is easy to set anchor section 2 flush against the other side of wall 11 while working from one side of wall 11.

Since anchor section 2 is stopped in a cross position by stopper mechanism 4, the positions of screw hole 9 of anchor section 2 and the position of screw shaft 1 are aligned, making it easy to screw in screw shaft 1 into screw hole 9. Moreover, as screw shaft 1 is screwed onto attachment ring 8, screw shaft 1 can be moved forward or backward, making it easy to screw into hole 9 because the positions are aligned.

The coupling of screw shaft 1 and anchor section 2 is strong because they are screwed together through screw hole 9 enabling marked anchoring strength through anchor section 2 to be obtained.

Moreover, since screw shaft 1 and anchor section 2 are coupled together by the screw action, the insertion length of screw shaft 1 to insertion hole 12 of wall can be adjusted; that is, by adjusting the amount of screw turns of screw shaft 1, the anchoring device can accommodate wall 11 and board 21 of varied thickness. In addition, the screw action enables screw shaft 1 to be removed from anchor section 2.

Trunnion 8a is affixed by protrusion 7a of adjustment hole 7 so that anchor section 2 stops in the cross position.

Plate spring 3 is clamped onto edge section 2b of anchor section 2 by the force of the spring 3.

As screw shaft 1 moves along the inner circumference surface of ring washer 5, screw shaft 1 remains affixed to ring washer 5, thus preventing screw shaft 1 from becoming detached and completely exiting screw hold 12 opposite the insertion side on wall 11.

Since holding section 6, 6 of anchor section 2 is held in the inner circumference surface of insertion hole 12, screw shaft 1 will not turn idly when screw shaft 1 is screwed into screw hole 9 of anchor section 2. Therefore, it is possible to easily insert screw shaft 1 into screw hole 9 of anchor section 2.

It is not necessary to use screw hole 9 on anchor section 2 when installing anchor section 2. In this case, screw shaft 1 and anchor section 2 are coupled only with ring washer 8.

Although plate spring 3 was used to re-position end 1a of screw shaft 1, a spring coil may be used instead.

The board anchor of the present invention enables both the screw shaft 1 and the anchor section 2 to be inserted through the insertion hole of the wall because the anchor section 2 is attached to the screw shaft 1 via ring washer 8 in a state of free rotation. For example, a board can be anchored to a wall only from one side of the wall, even if the wall is hollow. Also, since the anchoring work can be performed on one side of the wall one person can easily perform the work, thus enhancing operability and work efficiency.

As the stopper mechanism stops the anchor section 2 in a cross position, the anchor section 2 is easily placed flush to the wall on the other side even if the work is performed from one side.

Since the anchor section 2 is stopped in a cross position by the stopper mechanism 4, it is easy to screw the screw shaft 1 through the screw hole 9 of the anchor section 2 because the positions of the screw hole 12 in the anchor section 2 and the screw shaft 1 are aligned. Moreover, the screw shaft 1 can be moved forward or backward because it is easily screwed into the attachment ring as the screw position is aligned with the screw hole.

Further, as the screw shaft 1 and the anchor section 2 are coupled by a screw action through screw hole, the coupling is strong through the anchor section.

Moreover, since the screw shaft 1 and anchor section 2 are coupled with a screw action, the device can accommodate walls and boards of varied thickness, for example, by adjusting the length of the screw shaft 1 inserted in the wall hole 12.

While the embodiment has been described with reference to its preferred embodiment, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. An improved board anchor for securing a board to a wall member, said wall member having an opening formed therethrough, comprising:

a threaded shaft having a longitudinal axis;

a freely rotating anchor section attached to the screw shaft, said anchor section comprising a base portion and a channel shaped member having spaced apart, downwardly extending flange portions, each flange portion having a shaped opening formed therein, said base portion having an elongated portion with a threaded hole formed therein;

a rotatable attachment ring having first and second protrusions formed on the perimeter of said attachment ring and a threaded hole, said protrusions adapted to engage the corresponding opening formed on said anchor section, said threaded shaft being threadly coupled to said attachment ring prior to the insertion of said anchor portion within said wall member opening, said attachment ring protrusions and said shaped openings enabling said threaded shaft to be initially positioned substantially parallel to said longitudinal axis within said wall member opening and repositioning the anchor section to a first position substantially perpendicular to said screw shaft longitudinal axis after exiting said wall member opening, said shaped openings and said attachment ring protrusions acting together to lock said anchor section in said first position, said threaded shaft engaging said threaded hole in said anchor section when said anchor section is in said first position, said shaped openings and said attachment ring protrusions functioning to position said anchor section substantially perpendicular to said screw shaft longitudinal axis so that the threaded holes in said attachment ring and said elongated portion of said anchor section are aligned as said threaded shaft is rotated such that a portion of said threaded shaft extends through said aligned holes, said shaped openings limiting the angular rotation of said attachment ring relative to said anchor section to substantially 90°.

2. The board anchor of claim 1 wherein each of said shaped openings are formed by first and second spaced apart protrusions extending into a cavity.

3. The board anchor of claim 2 wherein sufficient space is provided between said first and second protrusions to enable said attachment ring protrusions to extend therebetween, said extending protrusions limiting the angular rotation of said attachment ring protrusions.

* * * * *